United States Patent [19]

Gunther

[11] 4,073,455
[45] Feb. 14, 1978

[54] TILTABLE BRACKET

[75] Inventor: Conrad J. Gunther, Uniondale, N.Y.

[73] Assignee: Dzus Fastener Co., Inc., West Islip, N.Y.

[21] Appl. No.: 729,683

[22] Filed: Oct. 5, 1976

[51] Int. Cl.² .............................................. A47F 5/00
[52] U.S. Cl. ................... 248/291; 248/299; 403/93; 403/102
[58] Field of Search ............... 248/288, 289, 299, 291, 248/274, 282, 284, 285, 286, 477; 403/101, 102, 97, 113, 117, 92, 93

[56] References Cited

U.S. PATENT DOCUMENTS

| | | | |
|---|---|---|---|
| 738,554 | 9/1903 | Lingel | 403/93 |
| 1,162,608 | 11/1915 | Hohl et al. | 248/285 |
| 1,703,059 | 2/1929 | Carpenter | 248/289 |
| 1,750,213 | 3/1930 | Collins | 403/93 |
| 2,718,407 | 9/1955 | Welsh | 403/92 |
| 2,818,291 | 12/1957 | Corns | 403/102 |
| 3,322,388 | 5/1967 | Budreck | 248/282 |
| 3,811,715 | 5/1974 | Brudy | 403/93 |

*Primary Examiner*—Robert Hafer
*Attorney, Agent, or Firm*—Kane, Dalsimer, Kane, Sullivan & Kurucz

[57] ABSTRACT

A tiltable bracket which includes a first elongated member and a second elongated member. The members are pivotally interconnected and are restrained in a position with their respective longitudinal axes aligned. The members are pivotally interconnected to provide for relative pivoting therebetween a predetermined angular distance. A stop is provided to prevent further pivoting beyond the predetermined annular distance without restricting return of the members to the position with their longitudinal axes aligned.

8 Claims, 4 Drawing Figures

TILTABLE BRACKET

BACKGROUND OF THE INVENTION

On many occasions and in many environments it is desirable to have a substantially rigid bracket to be mounted to a support and to which may be mounted other structure. Furthermore, it may also be desirable even with the substantially rigid mounting to shift the structure held by the bracket to a different location for purposes of access to the structure or behind or below the structure. With conventionally known brackets it would be necessary to remove the bracket from the surface to which it is mounted, or disassemble the bracket and structure, and then shift the structure held by the bracket or released therefrom to provide access to that structure or an area behind the bracket and structure. This also necessitates the removal of a bolt and nut assembly or other rigid mounting means of a conventional nature which is a time consuming and tedious process. Also it is often difficult to reach the fastener means for holding the bracket in position particularly where the bracket is being utilized in the confined area.

The above problems appear, for example, in the telephone utility industry where a junction box is employed for main connections. In the junction box there are numerous wires and other elements of structure all housed with a rather confined area. The box is a relatively small structure so that it does not take up too much space. It is presently the practice to utilize brackets within the box to hold a connector bar to which individual wire connections are made. It is common to use two such brackets which have one end mounted directly to the interior surface of the box and have the connector bar mounted to the other end. When it is desired to get behind the connector bar to other electrical elements it is necessary to unbolt the brackets from the wall of the junction box and move the bar sufficiently to provide the necessary access. This is an example of one particular environment where it would be helpful to have a bracket which has a shiftable portion so that the brackets can be shifted to move the bar out of the way to provide the necessary freedom of access and then, when desired, the bracket shifted back into the original position. This should be accomplished without materially detracting from the overall strength of the brackets in holding the bar in position and should be controlled so that the degree of tilting of the bracket to the access position is not so great as to cause possible damage to the electrical connections or result in other deleterious effects to the interior structure of the junction box.

SUMMARY OF THE INVENTION

With the above background in mind, it is among the primary objectives of the present invention to provide a tiltable bracket which is adapted to be mounted in position on a rigid support and which is adapted to hold other structure thereon. An objective is to provide a bracket which is restrained in an initial substantially rigid position and which is adaptable to have a portion thereof tilted with respect to the remaining portion by the application of sufficient forces so that any structure mounted to the bracket will be shifted accordingly thereby providing access to desired areas on and around the bracket. It is also an objective to provide a bracket wherein the tilting angle is restricted so that a portion of the bracket can be tilted in at least one direction a predetermined angular distance and no further and can be returned to the initial position which is substantially rigid in nature. Another objective is to provide a one piece unitary bracket structure which is of a substantially rigid material and which has one portion pivotal with respect to the other portion to the desired angular degree. Furthermore, the bracket is designed for use in environments such as in telephone utility junction boxes whereby the bracket can be mounted to the box structure and have structure within the box mounted thereon so that tilting of a portion of bracket with respect to the remaining portion will cause shifting of the structure mounted thereon and then return of the bracket to the initial rigid configuration will return the structure mounted on the bracket to the intial position within the box.

In summary, a tiltable bracket is provided including a first elongated member and a second elongated member. The members are pivotally interconnected. Means is provided for restraining the members in a position with their respective longitudinal axes aligned. Means are also provided for permitting the relative pivoting of the members a predetermined angular distance. Finally, stop means is provided to prevent further pivoting beyond the predetermined annular distance without restricting return of the members to the position with their longitudinal axes aligned.

With the above objectives among others in mind, reference is made to the attached drawings.

DESCRIPTION OF THE PREFERRED EMBODIMENT

Figure 1:
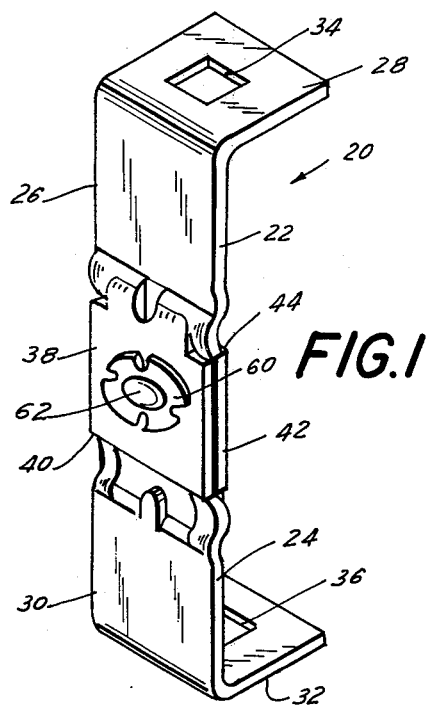
FIG. 1 is a perspective view of the tiltable bracket of the invention.

Bracket 20 includes a first elongated L-shaped member 22 and a second elongated L-shaped member 24 of identical configurations. Each member is L-shaped in configuration with the member 22 having a longer rectangularly shaped base leg 26 and an upstanding shorter leg 28 and, similarly, member 24 has a longer rectangularly shaped base leg 30 and a shorter upstanding leg 32.

Upstanding leg 28 has a rectangularly shaped aperture 34 therein and similarly shorter leg 32 has a rectangularly shaped aperture 36 therein. The shape of the aperture is a matter of choice depending upon the desired fastening equipment to be utilized with the bracket.

Longer legs 26 and 30 overlap with the overlapping portion 38 of leg 26 forming a leading edge 40 beneath leg 30 and the overlapping portion 42 of leg 30 forming a leading edge 44 above the surface of leg 26.

Immediately adjacent to leading edge 40 of leg 26 are a plurality of engaging surfaces on the undersurface of leg 30. Adjacent to one lateral edge is a shoulder 46 and directly opposite to shoulder 46 adjacent the other lateral edge is a projection 48. Intermediate the edges and spaced slightly behind shoulder 46 and projection 48 is a projecting stop tab 50.

Similar surfaces are present on the upper surface of leg 26 adjacent to leading edge 44. These include a shoulder 52 adjacent one lateral edge and opposite to shoulder 52 is a projection 54 aligned therewith. Intermediate shoulder 52 and projection 54 is a stop tab 56 which is placed slightly axially behind the shoulder 52 and the projection 54.

The overlapping portions 38 and 42 have aligned openings therein through which is passed a fastening rivet 58. The rivet is prevented from locking the two bracket members into tight interengagement by means of a spring washer 60 captured between the undersurface of the head 62 of the rivet and the upper surface of projection 38. This slight clearance provided by the washer 60 permits rotation or pivoting of one bracket member with respect to the other. Naturally any conventional pivot well known in art can be used in place of rivet 58 and spring washer 56 to hold the two bracket members together and permit their relative rotation.

Figure 2:
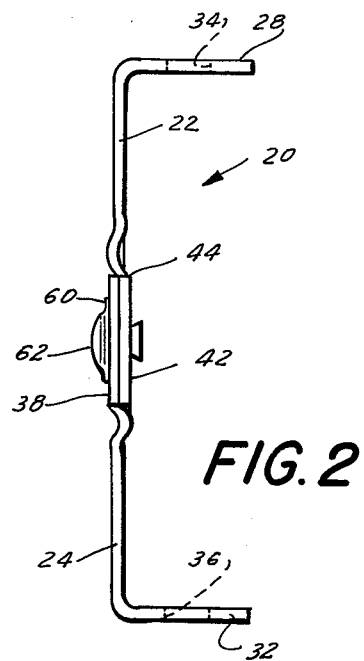
FIG. 2 is a side elevation view thereof.
Figure 3:
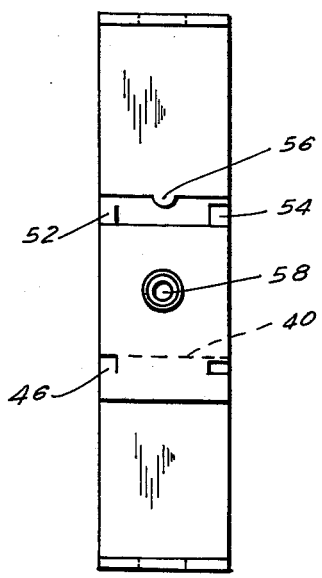
FIG. 3 is a bottom plan view thereof in the untilted position.

In the initial restraining position as shown in FIGS. 1, 2 and 3 relative rotation between the bracket members 22 and 24 is prevented in one direction by engagement between shoulder 52 and leading edge 44 and corresponding shoulder 46 and leading edge 40. Angular movement in the opposite direction is restrained by engagement between leading edge 44 and projection 54 and corresponding leading edge 40 and projection 48.

Figure 4:
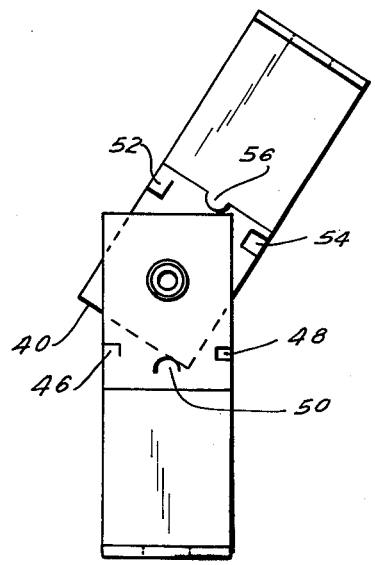
FIG. 4 is a bottom plan view thereof in the tilted position.

Upon application of a sufficient predetermined force depending upon the relative dimensions of projections 54 and 58 with respect to the leading edges 44 and 40 respectively, the bracket can be tilted so that leg 22 is pivoted with respect to leg 24. The degree of pivot is limited by stop tabs 56 and 50 which are positioned in a predetermined location with respect to the corresponding edges 44 and 40 so that a positive stop is attained. This position is depicted in FIG. 4. It has been found that an optimum angle of tilt for acceptable use of the bracket in environments such as junction boxes, is between the range of 30 degrees and 35 degrees.

With edge 44 in engagement with tab 56 and edge 40 in engagement with tab 50 no further tilting can occur. However the bracket can be returned to the initial position of FIGS. 1-3 with the bracket members 22 and 24 axially alinged by merely angularly pivoting the members relative to one another in the opposite direction with sufficient force to pass leading edge 44 over projection 44 again and leading edge 40 over projection 48 again. As stated above, further rotation beyond the longitudinally aligned position is prevented by engagement between leading edge 44 and shoulder 52 and leading edge 40 and shoulder 46.

A suitable material for bracket 20 has been found to be of stainless steel, however, naturally a suitable plastic or other metals can be employed for the bracket depending upon the use and the relative strengths and other parameters required.

While there are many acceptable environmental uses for the bracket 20, on which has been found to be advantages is in the telephone utility field particularly in respect to telephone junction boxes. One of the bracket members such as bracket No. 22 can be fixed to the wall of the junction box by a suitable bolt and nut assembly passed through opening 34. Other structures within the box, such as a connector bar, can be interconnected by a suitable bolt and nut assembly through aperture 36 in the other bracket member 24. With this assembly in the junction box and the normal position as shown in FIGS. 1-3 the bar will be held in the normally desired position for suitable electrical connections. When access is required to a portion of the bar and connections thereto or at some point in the box beyond the bar, the legs 22 and 24 can be relatively tilted the predetermined degree as discussed above to shift the bar to a desired location. After the work has been done, the bar can be returned to the initial restrained position holding the structure in the normal use location.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

I claim:

1. A tiltable bracket comprising; a first elongated member and a second elongated member, the members being pivotally interconnected, means for restraining the members in a position with their respective longitudinal axes aligned, means for permitting the relative pivoting of the members a predetermined angular distance, and stop means to prevent further pivoting beyond the predetermined angular distance without restricting return of the members to the position with their longitudinal axes aligned, a shoulder projecting from the surface of one bracket member into engagement with the leading edge of the other bracket member when the bracket members are aligned axially in the longitudinal direction so as to prevent angular pivoting between the bracket members in one direction, a projection formed on the surface of one of the bracket members and extending therefrom in position to engage with the leading edge of the other bracket member and restrain relative movement of the bracket members in the opposite angular direction when the members are axially aligned in the longitudinal direction, and a stop tab extending from the surface of one of the bracket members and spaced from the projection thereon so that when sufficient force is applied to the bracket members so that relative angular movement occurs with the leading edge of the one bracket member extending over the projection on the other bracket member, the angular movement will be permitted until the leading edge contacts the stop tab whereupon further angular movement in the opposite direction is prevented, the tab, projection and shoulder being positioned so that the bracket members can be returned to the axially longitudinally aligned position with the leading edge of the one bracket member passing again over the projection and being restrained from further movement in that direction by engagement with the shoulder.

2. The invention in accordance with claim 1 wherein each member is rectangular and L-shaped in configuration with the longer leg of each bracket member overlapping with the longer leg of the other bracket member at the ends distal from the shorter leg, the overlapping portion of each bracket containing an opening in alignment with the opening in the other bracket, a pivot pin passed through the aligned openings so as to pivotally interconnect the bracket members.

3. The invention in accordance with claim 2 wherein the pivot pin is formed by passing a rivet through the aligned openings in the bracket members and positioning a spring washer between the head of the rivet and the adjacent surface of the bracket members so as to provide sufficient resilience to the rivet for clearance to permit relative angular rotation between the bracket members.

4. The invention in accordance with claim 1 wherein the tiltable bracket is formed of stainless steel material.

5. The invention in accordance with claim 2 wherein the shorter leg of each bracket member contains an opening therein to facilitate mounting of the bracket on a supporting surface and to provide for mounting of additional structure to the bracket.

6. The invention in accordance with claim 1 wherein the predetermined angular pivotal distance of one bracket member with respect to the other is between 30° and 35°.

7. The invention in accordance with claim 1 wherein the tiltable bracket is adapted to be mounted in a telephone junction box with one bracket member mounted to the supporting structure of the box and the other bracket member adapted to have structural elements in the box mounted therein whereupon pivoting of the one bracket with respect to the other will shift the structure in the box interconnected therewith a predetermined distance to facilitate access to areas in the box blocked by the structure mounted to the bracket when the bracket is in the position with the bracket members having their longitudinal axes aligned.

8. A tiltable bracket comprising; a first elongated member and a second elongated member, the members being pivotally interconnected, means for restraining the members in a position with their respective longitudinal axes aligned, means for permitting the relative pivoting of the members a predetermined angular distance, stop means to prevent further pivoting beyond the predetermined angular distance without restricting return of the members to the position with their longitudinal axes aligned, each member being rectangular and L-shaped in configuration with the longer leg of each bracket member overlapping with the longer leg of the other bracket member at the ends distal from the shorter leg, the overlapping portion of each bracket containing an opening in alignment with the opening in the other bracket, a pivot pin passed through the aligned openings so as to pivotally interconnect the bracket members, a shoulder projecting from the surface of one bracket member into engagement with the leading edge of the other bracket member when the bracket members are aligned axially in the longitudinal direction so as to prevent angular pivoting between the bracket members in one direction, a projection extending from the surface of one of the bracket members in position to engage with the leading edge of the other bracket member and restrain relative movement of the bracket members in the opposite angular direction when the members are axially aligned in the longitudinal direction, a stop tab extending from the surface of one of the bracket members and spaced from the projection thereon so that when sufficient force is applied to the bracket members so that relative angular movement occurs with the leading edge of the one bracket member extending over the projection on the other bracket member, the angular movement will be permitted until the leading edge contacts the stop tab whereupon further angular movement in the opposite direction is prevented, the tab, projection and shoulder being positioned so that the bracket members can be returned to the axially longitudinally aligned position with the leading edge of the one bracket member passing again over the projection and being restrained from further movement in that direction by engagement with the shoulder, each bracket member having a shoulder, a stop tab and a projection positioned with respect to the leading edge of the other bracket member so that the shoulders, the stop tabs and the projections will cooperate simultaneously with the respective leading edges in restricting the angular pivoting of one bracket member with respect to the other bracket member.

* * * * *